United States Patent
Nam et al.

(10) Patent No.: US 8,363,188 B2
(45) Date of Patent: Jan. 29, 2013

(54) ARRAY SUBSTRATE OF LIQUID CRYSTAL DISPLAY DEVICE AND FABRICATING METHOD THEREOF

(75) Inventors: Mi Sook Nam, Suwon-si (KR); Jong Won Moon, Anyang-si (KR); Se June Kim, Paju-si (KR); Ha Young Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 750 days.

(21) Appl. No.: 11/321,997

(22) Filed: Dec. 29, 2005

(65) Prior Publication Data

US 2007/0002234 A1 Jan. 4, 2007

(30) Foreign Application Priority Data

Jun. 29, 2005 (KR) .................. 10-2005-0057261

(51) Int. Cl.
*G02F 1/1333* (2006.01)
*G02F 1/1337* (2006.01)
*G02F 1/1343* (2006.01)

(52) U.S. Cl. ......... 349/122; 349/123; 349/138; 349/139

(58) Field of Classification Search .................. 349/122, 349/123, 138, 139
See application file for complete search history.

(56) References Cited

U.S. PATENT DOCUMENTS

| | | | | |
|---|---|---|---|---|
| 2002/0126243 A1* | 9/2002 | Hibino et al. | ................. | 349/122 |
| 2003/0184697 A1* | 10/2003 | Ueda | .............................. | 349/122 |
| 2005/0041170 A1* | 2/2005 | Chae | ................................ | 349/43 |
| 2005/0068479 A1* | 3/2005 | Moriya | .......................... | 349/117 |
| 2005/0231666 A1* | 10/2005 | Kim et al. | ..................... | 349/114 |
| 2006/0001810 A1* | 1/2006 | Park | .............................. | 349/129 |
| 2006/0164585 A1* | 7/2006 | Shih | .............................. | 349/144 |
| 2006/0170851 A1 | 8/2006 | Kawamoto | | |
| 2006/0256267 A1* | 11/2006 | Bone et al. | ..................... | 349/122 |
| 2008/0218646 A1* | 9/2008 | Miyachi et al. | ................. | 349/37 |

FOREIGN PATENT DOCUMENTS

| | | |
|---|---|---|
| DE | 691 14 191 | 3/1996 |
| JP | 2001-330726 | 11/2001 |
| KR | 1020020083248 A | 11/2002 |
| KR | 1020050039982 A | 5/2005 |
| WO | WO 2004/079416 | 9/2004 |

OTHER PUBLICATIONS

Office Action dated Feb. 14, 2007 for corresponding German Patent Application No. 10-2005-062 807.9-51.
Office Action issued in corresponding Korean Patent Application No. 10-2005-0057261, mailed Oct. 4, 2011.

* cited by examiner

*Primary Examiner* — Jerry Blevins
(74) *Attorney, Agent, or Firm* — Brinks Hofer Gilson & Lione (57) ABSTRACT

An array substrate of an LCD and a fabricating method thereof are provided. A first insulating layer is formed on the substrate. A TFT and a hardened liquid crystal layer are provided in a pixel region of the substrate. A second insulating layer is formed in the pixel region around the hardened liquid crystal layer such that the second insulating layer and the hardened liquid crystal layer are substantially planar. A first alignment layer is formed between the hardened liquid crystal layer and the first insulating layer. A pixel electrode is formed on the second insulating layer and the hardened liquid crystal layer and contacts a drain region of the TFT through a hole in the first insulating layer. A second alignment layer is formed on the entire substrate over the second insulating layer and the hardened liquid crystal layer.

9 Claims, 6 Drawing Sheets

ARRAY SUBSTRATE OF LIQUID CRYSTAL DISPLAY DEVICE AND FABRICATING METHOD THEREOF

TECHNICAL FIELD

The present invention relates to a liquid crystal display device, and more particularly, to an array substrate of a liquid crystal display device and a fabricating method thereof, in which the array substrate is compact and can be fabricated using simplified processes.

DESCRIPTION OF THE RELATED ART

With the rapid development of the present information-based society, flat panel displays are in increasing demand. Flat panel displays have a slim profile, are lightweight, and consume low power consumption, among others. Compared with cathode ray tubes (CRTs), a liquid crystal display device (LCD) has good visibility, low power consumption, and low heat emission. For these reasons, the LCD is considered as the next generation display device for mobile phones, computer monitors, and TV screens together with plasma display panel (PDP) and field emission display (FED).

The LCD includes two substrates in which electrodes for electric field generation are formed. The two substrates are arranged to face each other, and liquid crystals are injected between the two substrates. The liquid crystal molecules move due to an electric field generated when a predetermined voltage is applied to two electrodes. In this manner, an image is displayed by controlling transmittance that varies with the motion of the liquid crystal molecules.

In general, the liquid crystal molecules are anisotropic. The anisotropy of a liquid crystal cell or film changes depending on the distribution of liquid crystal molecules and tilt angles with respect to the substrate. This property is a factor in changing polarization according to a viewing angle of the liquid crystal cell or film.

Figure 1:
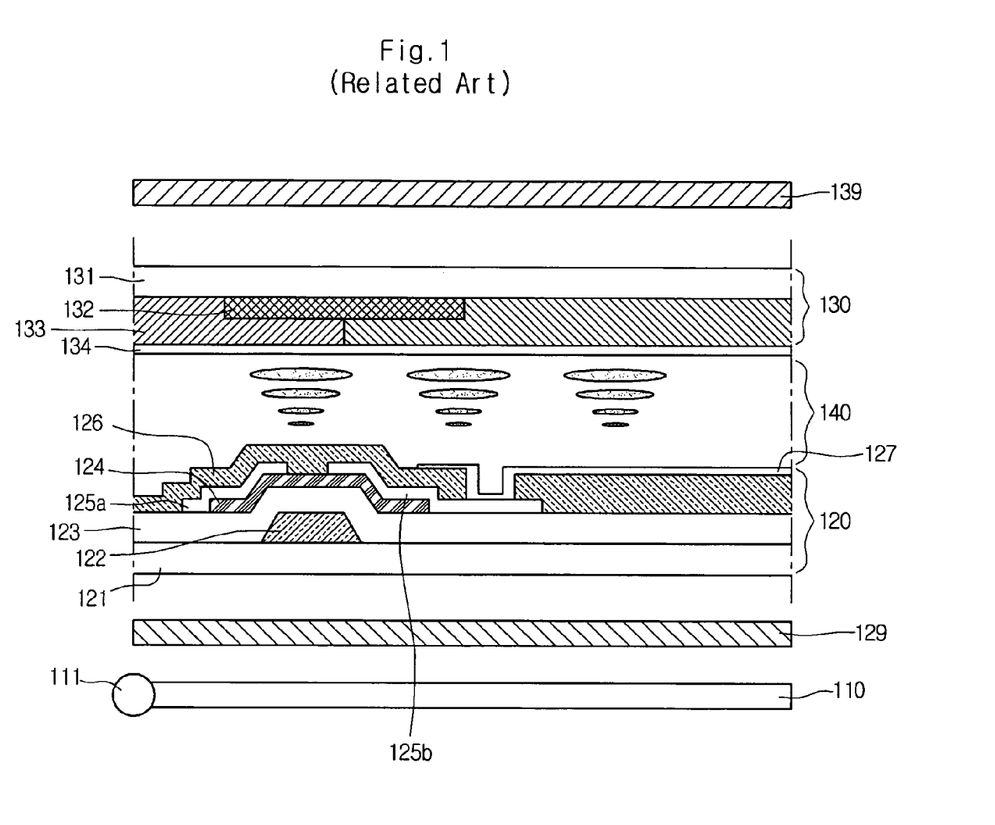
FIG. 1 is a sectional view of a related art LCD.

FIG. 1 is a sectional view of a related art LCD. Referring to FIG. 1, the related art LCD includes a array substrate 120 with TFTs (thin film transistors), a color filter substrate 130 with color filters, a liquid crystal layer 140 interposed between the array substrate 120 and the color filter substrate 130, a first polarizer 129 attached under the array substrate 120 to convert natural light into linearly polarized light, and a second polarizer 139 attached on the color filter substrate 130. The second polarizer 139 has a transmission axis perpendicular to that of the first polarizer 129.

The array substrate 120, the color filter substrate 130, and the liquid crystal layer 120 constitute a liquid crystal panel. A backlight unit 110 is further provided under the liquid crystal panel. The backlight unit 110 supplies the liquid crystal panel with light emitted from a light source 111.

The array substrate 120 includes a gate line and a data line intersected with one another on a transparent substrate 121. Also, the array substrate 120 includes a TFT with a gate electrode 122 extended from the gate line, a gate insulating layer 123 formed on an entire surface with the gate electrode 122, a semiconductor layer 124 formed on the gate insulating layer 123, and source/drain electrodes 125a and 125b formed on the semiconductor layer 124. A pixel electrode 127 is connected to the drain electrode 125b of the TFT through a contact hole formed on a passivation layer 126.

The color filter substrate 130 includes a black matrix 132 on a transparent substrate 131 so as to shield regions except the pixel electrode 127 from light. RGB color filter patterns 133 for expressing colors are formed on the black matrix 132. A common electrode 134 is formed on the color filter patterns 133.

The first and second polarizers 129 and 139 are respectively disposed on outer surfaces of the array substrate 120 and the color filter substrate 130 such that their transmission axes intersect at 90°. Therefore, the polarizers 129 and 139 divide the incident natural light into polarization components, and then transmit only one polarization component and absorb or scatter the other polarization component.

Light is an electromagnetic wave whose oscillating direction is perpendicular to its traveling direction. The polarized light is toward to the oscillating direction. That is, polarized light is light that strongly oscillates in a specific direction among directions perpendicular to the traveling direction.

Accordingly, light from the backlight unit 110 provided under the liquid crystal panel has the same probability in all directions. At this point, the first and second polarizers 129 and 139 transmit light oscillating only in a direction equal to the polarization axis, and absorb or reflect light oscillating in a direction different from the polarization axis by using an appropriate medium, thereby generating light oscillating in a specific direction.

Since the first and second polarizers 129 and 139 are attached to the array and color filter substrates such that their polarization axes are perpendicular to each other, the strength of the transmitted light is adjusted depending on the degree of rotation of the polarization axis, while passing through the liquid crystal layer 140. Therefore, various gray levels between black and white can be possible.

However, the polarized light transmitted by the first polarizer 129 attached to the array substrate is converted into non-polarized light while passing through the liquid crystal panel. Light is scattered due to the stepped portion of the array substrate 120 and the color filter layer 133 of the color filter substrate 130, and then is converted into the non-polarized light. Accordingly, the transmittance of the LCD is lowered due to the non-polarized light, thus decreasing the contrast ratio.

In order to solve this problem, much effort has been expended to provide wide viewing angle and high brightness by forming high-brightness film in the outside or inside of the liquid crystal panel. However, formation of the high-brightness film includes stacking at least one or two layers of a circular polarization film and a hardened liquid crystal layer (compensation film), coating an interlayer adhesive, and so on. Through these complicated processes, at least 4 layers or more usually 7-8 layers have to be stacked. The use of this large number of layers increases the fabrication time as well as increasing the probability of damage to the film itself due to the multiple attaching processes. In addition, as the number of layers increases, the thickness of the liquid crystal panel similarly increases.

SUMMARY

By way of example only, in one embodiment, an array substrate of an LCD (liquid crystal display device) comprises: a substrate having a pixel region and a TFT (thin film transistor) provided in the pixel region, a first insulating layer on the substrate, a hardened liquid crystal layer in the pixel region, and a second insulating layer substantially planar with the hardened liquid crystal layer.

In another embodiment, the LCD array substrate comprises: a gate line formed on a substrate, a gate electrode in a TFT region of the substrate and connected to the gate line, a gate insulating layer on the gate line and the gate electrode, an active layer on the gate electrode, an ohmic contact layer on the active layer, a data line perpendicular to the gate line, a source electrode and a drain electrode on the ohmic contact layer in the TFT region, the source electrode extended from the data line, a first insulating layer on an entire surface of the substrate, the first insulating layer having a contact hole exposing a portion of the drain electrode, a second insulating layer on the gate line, the data line, and the TFT region, a hardened liquid crystal layer in a pixel region, and a pixel electrode connected to the drain electrode through the contact hole.

In another embodiment, a method of fabricating an array substrate of an LCD comprises: providing a pixel region and forming a TFT (thin film transistor) in the pixel region; forming a first insulating layer on the substrate; forming a second insulating layer in a predetermined region including the TFT on the first insulating layer; and forming a hardened liquid crystal layer in the pixel region such that the hardened liquid crystal layer does not overlap the second insulating layer on the first insulating layer.

In another embodiment, a method of fabricating an LCD that includes a gate line, a data line perpendicular to the gate line, and a TFT (thin film transistor) having a gate electrode, a source electrode, and a drain electrode, comprises: forming a first insulating layer on the TFT such that the first insulating layer has a contact hole exposing a portion of the drain electrode; forming a second insulating layer pattern in a predetermined region of the first insulating layer, the predetermined region having the TFT, the gate lines, and the data lines; forming a hardened liquid crystal layer on the first insulating layer such that the hardened liquid crystal layer does not overlap the second insulating layer pattern; and forming a pixel electrode on the hardened liquid crystal layer such that the pixel electrode is connected to the drain electrode through the contact hole.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4A to 4I are sectional views illustrating a method of fabricating an array substrate of an LCD according to an embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 2:
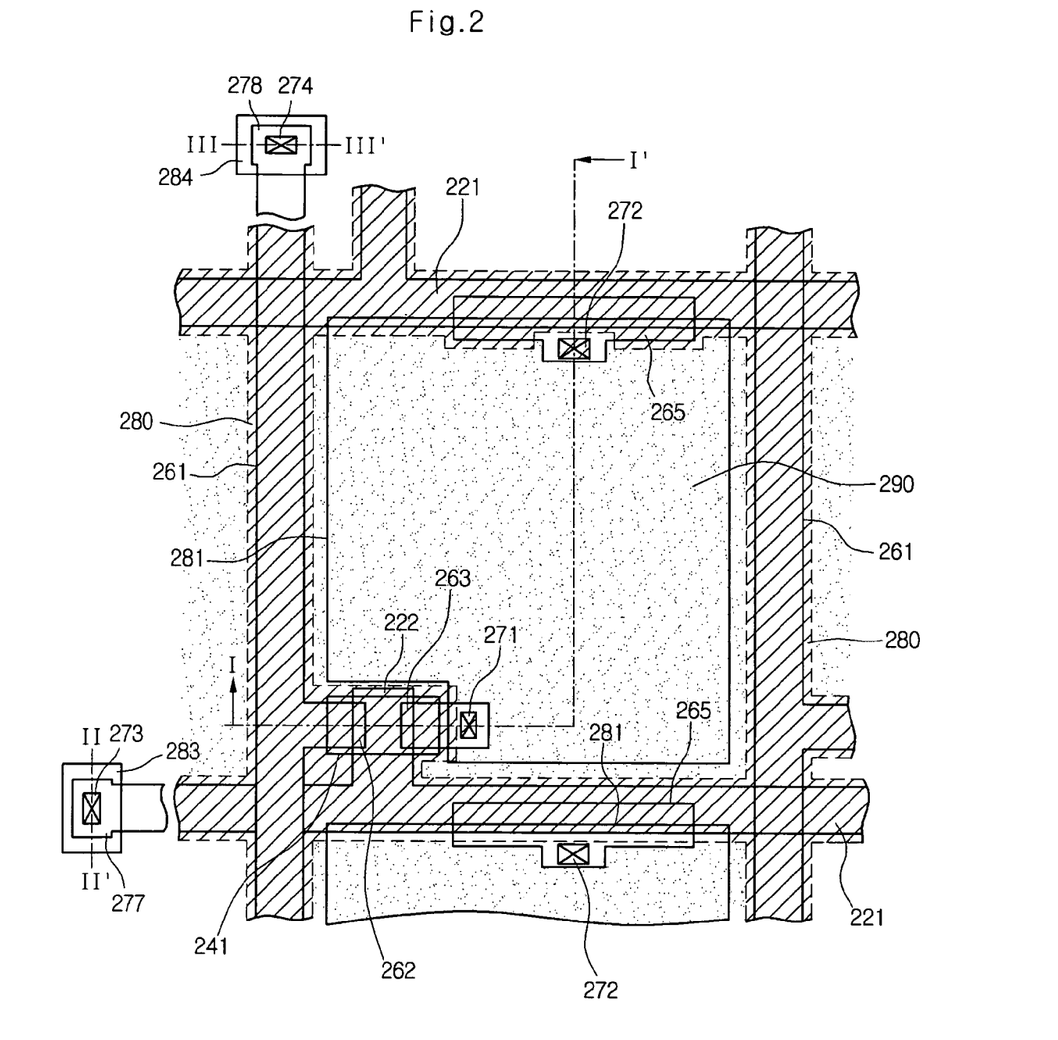
FIG. 2 is a plan view of an array substrate of an LCD according to an embodiment of the present invention.
Figure 3:
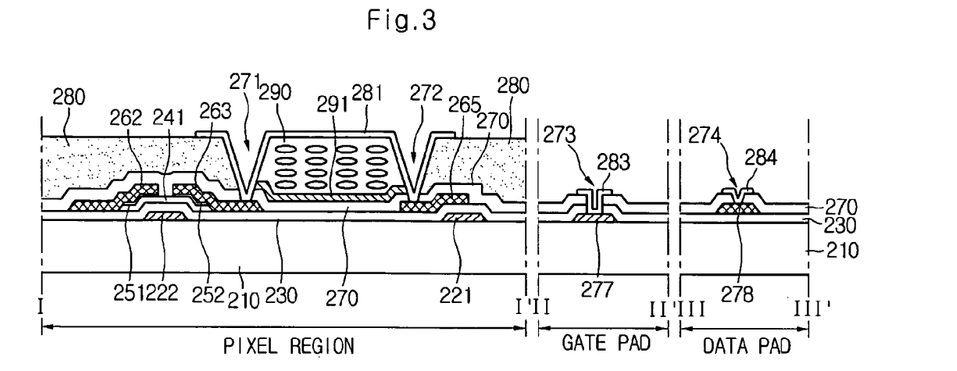
FIG. 3 is a sectional view taken along I-I', II-II' and III-III' of FIG. 2.

FIG. 2 is a plan view of an array substrate of an LCD according to an embodiment of the present invention. FIG. 3 is a sectional view taken along lines I-I', II-II' and III-III' of FIG. 2.

Referring to FIGS. 2 and 3, a gate line 221 is formed on a transparent insulating substrate 210 in a horizontal direction and is connected to a gate pad 277. A gate electrode 222 protrudes from the gate line 221. A gate pad top electrode 283 contacts the gate pad 277 through a third contact hole 273. The gate pad top electrode 283 is formed of a transparent conductive material. A gate insulating layer 230 is formed on the resultant structure in which the gate line 221 and the gate electrode 222 are formed. An active layer 241 and ohmic contact layers 251 and 252 are sequentially formed on the gate electrode.

A data line 261, which perpendicular to the gate line 221, also forms a data pad 278. A source electrode 262 extends from the data line 261. A drain electrode 263 faces the source electrode 262 centering on the gate electrode 222. A capacitor electrode 265 overlaps the gate line 221. The gate electrode 222, the active layer 241, the ohmic contact layers 251 and 252, the source electrode 262, and the drain electrode 263 form a TFT near an intersection of the gate line 221 and the data line 261.

A data pad top electrode 284 contacts the data pad 278 through a fourth contact hole 274. The data pad top electrode 284 is formed of a transparent conductive material.

The data line 261, the source and drain electrodes 262 and 263, and the capacitor electrode 265 are covered with a passivation layer 270. In the passivation layer 270, a first contact hole 271 is formed to expose the drain electrode 263, and a second contact hole is formed to expose the capacitor electrode 265. In addition, third and fourth contact holes 273 and 274 penetrate the passivation layer 270 or the gate insulating layer 230 to expose the gate pad 277 and the data pad 278. The passivation layer 270 may be formed of an inorganic insulating material such as silicon nitride (SiNx) or silicon oxide (SiOx).

A pixel region is defined by the intersection of the gate line 221 and the data line 261. A pixel electrode 281 is formed in the pixel region. The pixel electrode 281 is connected to the drain electrode 262 through the first contact hole 271, and is connected to the capacitor electrode 265 through the second contact hole 272.

In addition, a planarization layer 280 is formed on the gate line 221, the data line 261, and the TFT. The planarization layer 280 may be formed of an organic insulating layer, such as photo acryl or benzocyclobutene (BCB).

An alignment layer 291 and a hardened liquid crystal layer (compensation film) 290 are formed on the pixel region. The hardened liquid crystal layer 290 contains photosensitive liquid crystal. The photosensitive liquid crystal may contain a reactive liquid crystal such as a reactive mesogen. The alignment layer 291 is formed by coating an alignment material such as a polyimide. After the alignment layer 291 is formed, a solution containing reactive liquid crystal molecules is coated using spin coating, bar coating, or slit die coating, for example, and then is hardened cured by at least one of thermosetting or irradiation using ultraviolet (UV) radiation. The alignment layer aligns the reactive liquid crystal material.

If the photosensitive liquid crystal 290 is aligned by the alignment layer and then is hardened by irradiation and/or thermosetting, liquid crystals of the hardened liquid crystal layer 290 are fixedly arranged in one direction, such that they act as the compensation film within the pixel region. Accordingly, the compensation film formed of the hardened liquid crystal layer 290 is arranged under the pixel electrodes 281.

The pixel electrode 281 is then formed on the compensation film 290 and a portion of the planarization layer 280. An alignment layer (not shown) is then formed on the pixel electrode 281. The planarization layer 280 removes a step difference from the hardened liquid crystal layer 290. In other words, the planarization layer 280 is substantially planar with the hardened liquid crystal layer 290. Therefore, in rubbing the alignment layer on the pixel electrode 281, disclination due to alignment non-uniformity can be prevented.

Figure 4A:
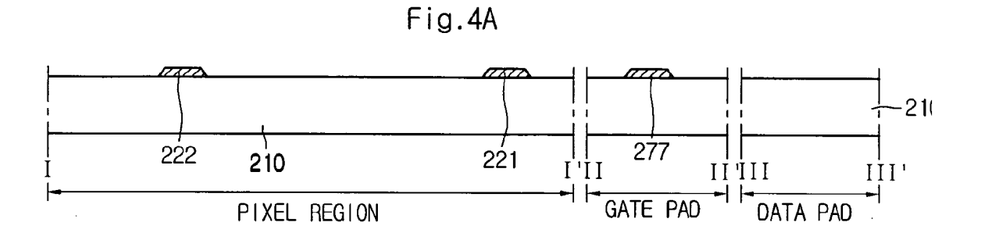

FIGS. 4A to 4F are sectional views taken along lines I-I', II-II' and III-III' of FIG. 2, showing a method of fabricating an array substrate of an LCD according to an embodiment of the present invention. Referring to FIG. 4A, a metal material is deposited on a substrate 210 and is patterned to form a gate line 221, a gate electrode 222, and a gate pad 277.

Figure 4B:
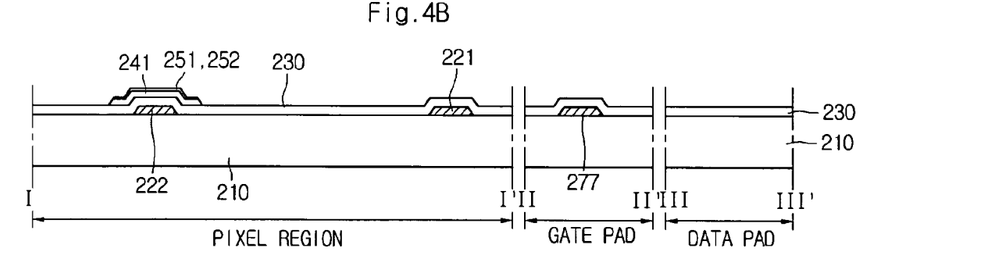

Referring to FIG. 4B, a gate insulating layer 230 is formed by depositing one or more inorganic insulating materials such as silicon nitride (SiNx) or silicon oxide ($SiO_2$) on the gate pad 277 and the gate electrode 222. The gate insulating layer 230, an amorphous silicon layer and a n+ layer are substantially sequentially deposited and are patterned by photolithography to thereby form an active layer 241 and doped semiconductor layers 251 and 241, which are formed in an island shape.

Figure 4C:
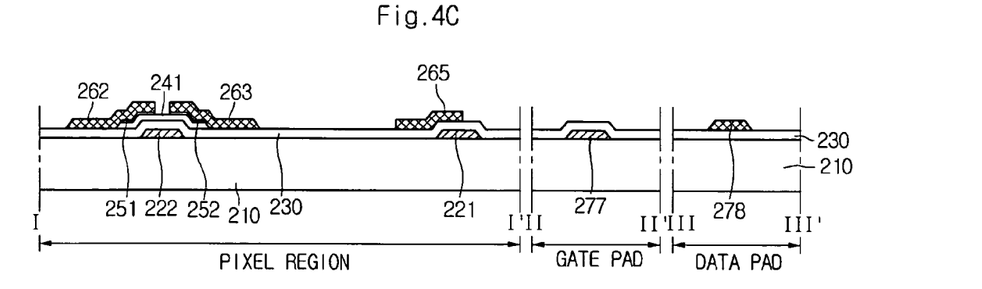

Referring to FIG. 4C, a metal layer is deposited and patterned to form a source electrode 262 that protrudes from the data line 261, a drain electrode 263 spaced apart from the source electrode 262 by a predetermined distance, and a data pad 278 that extends from the data line 261. The impurity semiconductor layer exposed between the source electrode 262 and the drain electrode 263 is etched to form ohmic contact layers 251 and 252. In addition, a capacitor electrode 265 that overlaps the gate line 221 is formed.

Figure 4D:
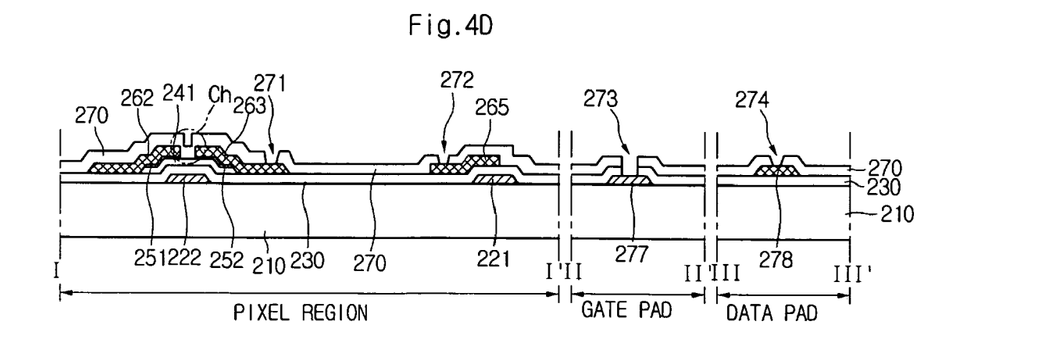

Referring to FIG. 4D, a passivation layer 270 is deposited on the substrate 210 where the source electrode 262, the drain electrode 263, and the data pad 278 are formed. The passivation layer is formed by depositing one or more inorganic insulating materials such as silicon nitride (SiNx) or silicon oxide ($SiO_2$). The passivation layer 270 is patterned to form first and second contact holes 271 and 272 respectively exposing the drain electrode 263 and the capacitor electrode 265. Also, third and fourth contact holes 273 and 274 penetrate the passivation layer 270 or the gate insulating layer 230 to expose the gate pad 277 and the data pad 278. In other embodiments, the passivation layer 270 may be removed between the drain electrode 263 and the capacitor electrode 265.

Figure 4E:
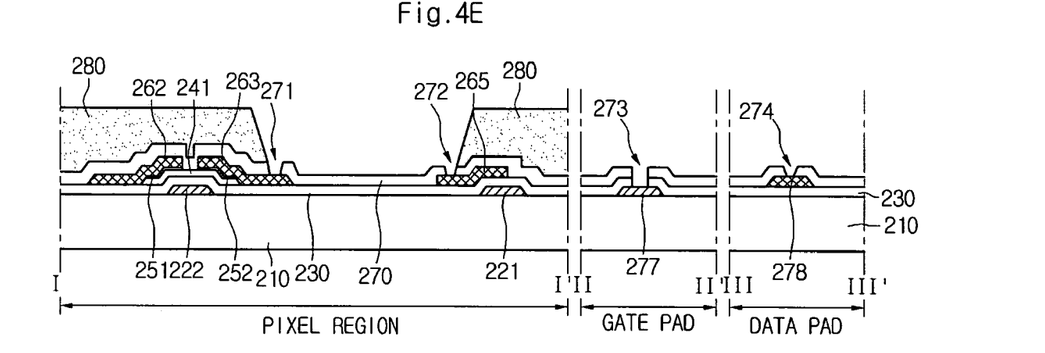

Referring to FIG. 4E, a planarization layer 280 is further formed on the gate line 221, the data line 261, and the TFT. The passivation layer 280 may be formed of an organic insulating layer, such as photo acryl or benzocyclobutene (BCB). More specifically, the planarization layer 280 is formed by depositing one organic insulating material, such as photo acryl based resin, on the substrate 210. This organic insulating material is photosensitive.

When the planarization layer 280 is formed, the photo acryl organic insulating material is deposited on the passivation layer 270 by a spin method or a roll coating method. Then, the photo acryl organic insulating material is patterned by photolithography. That is, a photo mask is covered over the photo acryl organic insulating material and exposed to ultraviolet (UV) radiation. Consequently, the photo acryl organic insulating material is exposed through patterns of the photo mask. By developing the exposed portion using a developer, the photo acryl organic insulating material is patterned to form the polarization layer pattern on the gate line 221, the data line 261, and the TFT region.

Figure 4F:
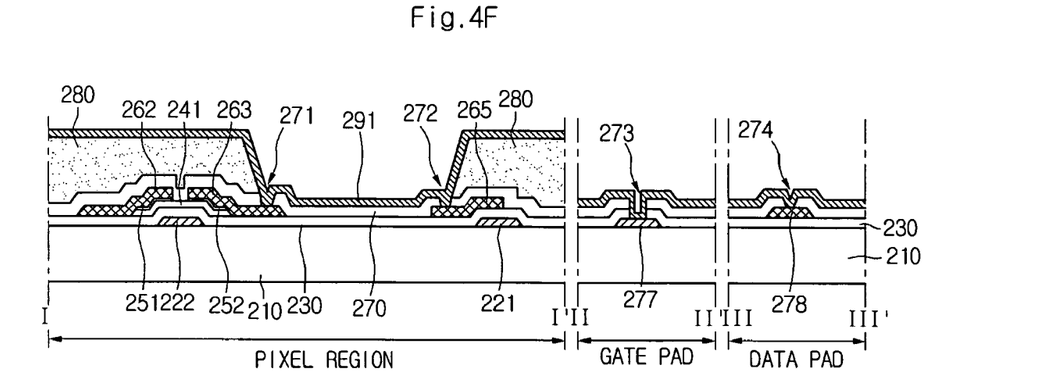

Referring to FIG. 4F, an alignment layer 291 is formed in the pixel region. The alignment layer 291 is formed by coating alignment material such as polyimide on the underlying layers. As shown, the alignment layer 291 coats the entire surface of the substrate 210. In other embodiments, the alignment layer 291 may be disposed on the substrate 210 or the gate insulating layer 230.

Figure 4G:
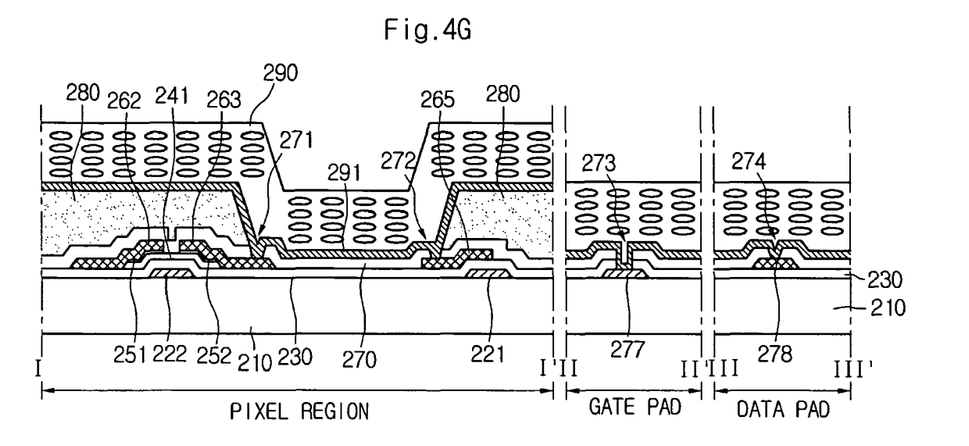

Referring to FIG. 4G, a hardened liquid crystal layer (compensation film) 290 is formed on the substrate where the alignment layer 291 is formed. The hardened liquid crystal layer 290 acts as a quarter wave plate using a reactive liquid crystal. To form the compensation film 290, a solution containing the reactive liquid crystal molecules is coated on the entire surface of the substrate 210 using spin coating, bar coating, or slit die coating. The solution is then hardened by curing the solution using UV radiation and/or thermosetting.

Figure 4H:
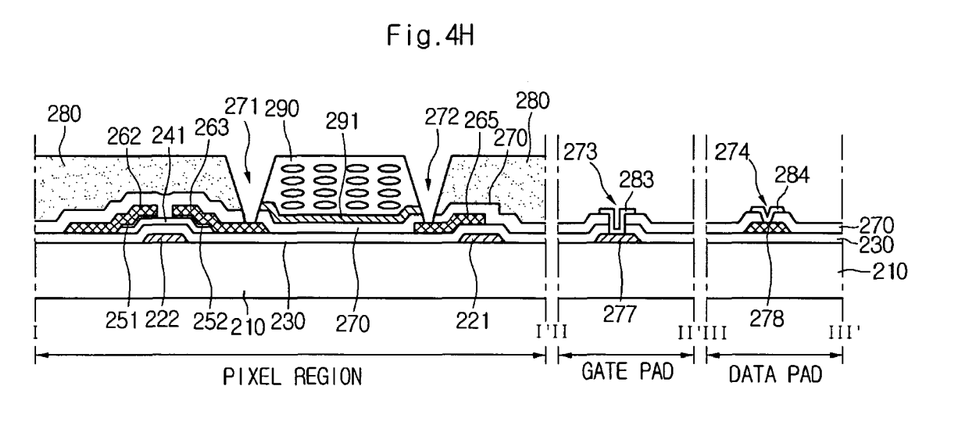

Referring to FIG. 4H, the hardened liquid crystal layer 290 containing the reactive liquid crystal molecules and the alignment layer 291 are patterned in the pixel region. This process will be described below in detail.

The hardened liquid crystal layer 290 is patterned by photolithography. That is, a photo mask is covered over the photosensitive liquid crystal layer and exposed to ultraviolet (UV) radiation. Consequently, the photosensitive liquid crystal layer is exposed through patterns of the photo mask. By developing the exposed portion using a developer, the material for the hardened liquid crystal layer is patterned such that the alignment layer 291 and hardened liquid crystal layer 290 are formed only in the pixel region.

Figure 4I:
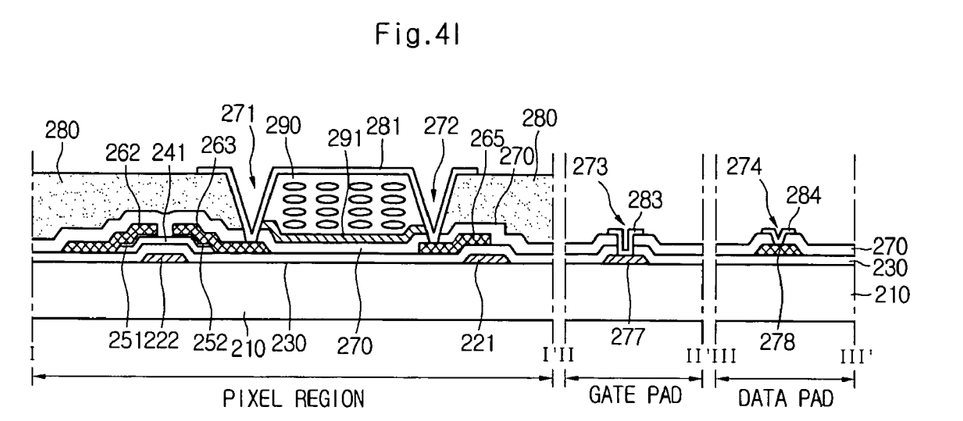

Referring to FIG. 4I, a pixel electrode 281 is formed on the hardened liquid crystal layer 290 in the pixel region. The pixel electrode is formed of a transparent conductive material, such as indium tin oxide (ITO) or indium zinc oxide (IZO). Also, the pixel electrode 281 is connected to the drain electrode 262 and the capacitor electrode 265 through the first and second contact holes 271 and 272, respectively. In other embodiments, the pixel electrode 281 can be formed before the alignment layer 291 and thus between the alignment layer 291 and the substrate 210. For example, the pixel electrode 281 can be formed such that it contacts the substrate 210.

As the hardened liquid crystal layer 290 is formed in the pixel region and the planarization layer 280 is formed elsewhere, the step difference between these regions is compensated. Accordingly, disclination is decreased.

In order to align the liquid crystal layer, an alignment layer (not shown) is formed between the array substrate and the color filter substrate on an entire surface of the array substrate where the pixel electrodes 281 are formed. The alignment layer can be uniformly coated because there is essentially no step difference between the region where the pixel electrode 281 is formed and the region where the planarization layer 280 is formed.

In addition, a gap between the data line 261 and the pixel electrode 281 can be reduced by forming the planarization layer 280 on the array substrate inside the liquid crystal panel, thus enhancing the aperture ratio. Further, the liquid crystal can be made compact by forming the hardened liquid crystal layer 290 within the liquid crystal panel.

As described above, the array substrate of the LCD shown and described provides a high aperture ratio by forming the hardened liquid crystal layer in the pixel region. In addition, a slim LCD can be manufactured by patterning the hardened liquid crystal layer in the form of a thin film within the liquid crystal panel.

It will be apparent to those skilled in the art that various modifications and variations can be made in the present invention. Thus, it is intended that the present invention covers the modifications and variations of this invention provided they come within the scope of the appended claims and their equivalent.

What is claimed is:

1. An array substrate of an liquid crystal display device (LCD), comprising:
   a substrate having a pixel region and a thin film transistor (TFT) provided in the pixel region;
   a first insulating layer on the substrate;
   a hardened liquid crystal layer in the pixel region, the hardened liquid crystal layer containing a reactive liquid crystal;
   a second insulating layer substantially planar with the hardened liquid crystal layer;
   a pixel electrode electrically connected to the TFT on the hardened liquid crystal layer, the pixel electrode being disposed on the hardened liquid crystal layer; and
   a first alignment layer is disposed on the first insulation layer in the pixel region; and
   a second alignment layer to align a liquid crystal layer is disposed on the pixel electrode and on the second insulating layer,
   wherein the hardened liquid crystal layer is disposed on the first alignment layer in the pixel region,
   wherein the hardened liquid crystal layer and the first alignment layer are wholly covered by the pixel electrode in the pixel region,
   wherein the hardened liquid crystal layer is disposed between the first alignment layer and the pixel electrode.

2. The array substrate according to claim 1, wherein the first insulating layer comprises an inorganic insulating layer.

3. The array substrate according to claim 1, wherein the second insulating layer comprises an organic insulating layer.

4. The array substrate according to claim 1, wherein the second insulating layer comprises a photosensitive organic insulating layer.

5. The array substrate according to claim 1, wherein the second insulating layer to being formed of photo acryl or benzocyclobutene (BCB).

6. The array substrate according to claim 1, wherein the hardened liquid crystal layer includes a reactive mesogen.

7. The array substrate according to claim 1, wherein the second insulating layer and the hardened liquid crystal layer do not overlap each other.

8. The array substrate according to claim 1, further comprising the second alignment layer on an entire region of the substrate where the hardened liquid crystal layer and the second insulating layer are formed.

9. The array substrate according to claim 1, wherein the hardened liquid crystal layer comprises a photosensitive liquid crystal.

* * * * *